United States Patent
Xu et al.

(10) Patent No.: US 9,306,680 B2
(45) Date of Patent: Apr. 5, 2016

(54) METHOD AND DEVICE FOR CALIBRATING FREQUENCY SYNTHESIZER IN COMMUNICATION TERMINAL

(71) Applicant: Spreadtrum Communications (Shanghai) Co., Ltd., Shanghai (CN)

(72) Inventors: Dian Xu, Shanghai (CN); Yi Zhao, Shanghai (CN); Yufeng Jin, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 0 days.

(21) Appl. No.: 14/341,882

(22) Filed: Jul. 28, 2014

(65) Prior Publication Data

US 2015/0155954 A1    Jun. 4, 2015

(30) Foreign Application Priority Data

Nov. 29, 2013   (CN) .......................... 2013 1 0630356

(51) Int. Cl.
*H04B 17/00*          (2015.01)
*H04B 17/21*          (2015.01)

(52) U.S. Cl.
CPC ...................................... *H04B 17/21* (2015.01)

(58) Field of Classification Search
CPC ................................ H04L 27/00; H04L 27/06
See application file for complete search history.

(56) References Cited

U.S. PATENT DOCUMENTS

| 8,638,889    | B2 * | 1/2014  | Currivan et al. | 375/344 |
| 2007/0280098 | A1 * | 12/2007 | Bhatt et al.    | 370/208 |
| 2012/0163499 | A1 * | 6/2012  | Kim et al.      | 375/298 |
| 2012/0288026 | A1 * | 11/2012 | Wang            | 375/285 |
| 2013/0170576 | A1 * | 7/2013  | Liu             | 375/295 |
| 2014/0153461 | A1 * | 6/2014  | Lorenz et al.   | 370/311 |

OTHER PUBLICATIONS

Newton, Harry, Newton's Telecom Dictionary: 22nd Edition (Newton's Telecom Dictionary) CMP Books, ISBN: 9781578203192, 2006.*

* cited by examiner

*Primary Examiner* — Jaison Joseph
(74) *Attorney, Agent, or Firm* — Cantor Colburn LLP

(57) ABSTRACT

A method and a device for calibrating frequency synthesizer in communication terminal are provided. The method may include: controlling the communication terminal to transmit a continuous wave signal in a specified channel; controlling a measurement device to measure the continuous wave signal to obtain a measured frequency deviation value of the frequency synthesizer in the communication terminal; calculating a center oscillation frequency point of a reference crystal oscillator of the communication terminal and a frequency calibration step corresponding to the center oscillation frequency point based on the measured frequency deviation value; and storing the center oscillation frequency point and the corresponding frequency calibration step in the communication terminal. The method can reduce frequency calibration cost and time.

10 Claims, 3 Drawing Sheets

METHOD AND DEVICE FOR CALIBRATING FREQUENCY SYNTHESIZER IN COMMUNICATION TERMINAL

CROSS-REFERENCE TO RELATED APPLICATIONS

The present application claims priority to Chinese patent application No. 201310630356.9, filed on Nov. 29, 2013, and entitled "METHOD AND DEVICE FOR CALIBRATING FREQUENCY SYNTHESIZER IN COMMUNICATION TERMINAL", the entire disclosure of which is incorporated herein by reference.

TECHNICAL FIELD

The present disclosure generally relates to communication technology, and more particularly, to a method and a device for calibrating a frequency synthesizer in a communication terminal.

BACKGROUND

Long Term Evolution (LTE) is an evolution of the third generation (3G) mobile telecommunication technology, and is initiated from the 3GPP (3rd Generation Partnership Project) Conference held in Toronto, 2004. It's a popular misconception that LTE is the fourth generation (4G) mobile telecommunication technology. Actually, LTE, as a transition between 3G and 4G, is a global standard of 3.9G. LTE improves and enhances the radio interface technology of 3G by using Orthogonal Frequency Division Multiplexing (OFDM) and Multiple-Input Multiple-Output (MIMO) as its only standard for wireless network evolution. Under a 20 MHz spectrum bandwidth, LTE provides a downlink peak rate of 326 Mbit/s and an uplink peak rate of 86 Mbit/s, so that performances of cell-edge users are improved, cell capacity is increased and system delay is decreased.

With the development of the LET technology and the acceleration of the commercialization process of LET communication terminals (including cell phones, wireless network cards and modules), the communication terminals should be automatically calibrated in order to meet requirements of mass production of LTE terminals. The automatic calibration at least includes Automatic Power Control (APC) calibration, Automatic Gain Control (AGC) calibration and Automatic Frequency Control (AFC) calibration, where AFC is an automatic control method for maintaining a fixed relationship between an output signal frequency of a communication terminal and a predetermined frequency.

In development and production processes of LET communication terminals, frequency accuracy of frequency synthesizers should be calibrated, so as to keep synchronization with the base station. In such way, network searching period after booting may be shortened, especially when tracking frequency in a high or low temperature environment.

A common process for calibrating frequency synthesizers in thousands of communication terminals on the production line may include: a communication terminal transmitting a modulated signal of an associated communication mode to an integrated tester; the integrated tester demodulating the modulated signal in the physic layer, where the modulated signal may have a modulation mode like Globe System of Mobile Communication (GSM), Time Division-Synchronous Code Division Multiple Access (TD-SCDMA), Wideband Code Division Multiple Access (WCDMA), etc., and the demodulated results includes information of frequency error; and calculating frequency characteristics of a reference crystal oscillator of the communication terminal based on the information of frequency error; and storing calibration parameters, which include a center oscillation frequency point and a frequency calibration step, in a memory of the communication terminal. Therefore, in daily use, the communication terminal can extract these calibrated parameters to find a network, keep the clock synchronized with the base station and so on.

However, with development of the communication technology and gradual evolution of the mobile telecommunication along 2G, 3G and 4G because communication mode of communication terminals is changed by using a new generation mobile telecommunication technology, equipment and software in R&D and product calibration lines cannot be used to calibrate frequency synthesizers in the communication terminals with the new communication mode. For example, if equipments originally used for calibrating frequency synthesizers in TD-SCDMA or WCDMA communication terminals are used for calibrating frequency synthesizers in LTE communication terminals, original R&D and product calibration lines should be updated, or equipment and software having LTE digital modem modules should be purchased, which results in increasing of frequency calibration cost.

SUMMARY

The present disclosure provides embodiments to enable a frequency calibrating device used for calibrating a frequency synthesizer in a communication terminal under an original communication mode to implement frequency calibration for communication terminals under a new communication mode.

In one embodiment, a method for calibrating a frequency synthesizer in a communication terminal is provided. The method may include: controlling the communication terminal to transmit a continuous wave signal in a specified channel; controlling a measurement device to measure the continuous wave signal to obtain a measured frequency deviation value of the frequency synthesizer in the communication terminal; calculating a center oscillation frequency point of a reference crystal oscillator of the communication terminal and a frequency calibration step corresponding to the center oscillation frequency point based on the measured frequency deviation value; and storing the center oscillation frequency point and the corresponding frequency calibration step in the communication terminal.

In some embodiments, controlling the measurement device to measure the continuous wave signal to obtain the measured frequency deviation value of the frequency synthesizer in the communication terminal may include: controlling the measurement device to receive the continuous wave signal in a predetermined period; measuring two output frequencies, where the two output frequencies are output by the communication terminal respectively under control of two different frequency control words; calculating two frequency differences between each of the two measured output frequencies and a frequency of the continuous wave signal; and reporting the two frequency differences as the measured frequency deviation value.

In some embodiments, controlling the measurement device to measure the continuous wave signal to obtain the measured frequency deviation value of the frequency synthesizer in the communication terminal may further include: before activating the measurement device to receive the continuous wave signal in the predetermined period, transmitting, to the measurement device, configuration parameters for calibrating the frequency synthesizer in the communication terminal In some embodiments, calculating the center oscillation frequency point of the reference crystal oscillator of the communication terminal and the frequency calibration step corresponding to the center oscillation frequency point may include: calculating the corresponding frequency calibration step of the reference crystal oscillator under the center oscillation frequency point, based on a difference between the two frequency differences and a difference between the two different frequency control words.

In some embodiments, the method may further include: calculating a corresponding frequency control word of the reference crystal oscillator under the center oscillation frequency point based on the frequency calibration step, any one of the frequency control words and its corresponding frequency difference.

In some embodiments, the predetermined period starts from a time point after a first time interval elapses since a calibration command is received, and ends after a second time interval in which the communication terminal transmits the continuous wave signal; and the first time interval and the second time interval are determined based on computing performance of the communication terminal and the measurement device.

In some embodiments, the first time interval values a time period for lasting 3 to 5 consecutive subframes, and the second time interval values a time period for lasting 8 to 10 consecutive subframes.

In some embodiments, the communication terminal may support at least one communication mode of LTE, TD-SCDMA, WCDMA, GSM, WiMax and WiFi.

In one embodiment, a device for calibrating a frequency synthesizer in a communication terminal is provided. The device may include: a first control unit adapted for controlling the communication terminal to transmit a continuous wave signal in a specified channel; a second control unit adapted for controlling a measurement device to measure the continuous wave signal to obtain a measured frequency deviation value of the frequency synthesizer in the communication terminal; a first calculation unit adapted for calculating a center oscillation frequency point of a reference crystal oscillator of the communication terminal and a frequency calibration step corresponding to the center oscillation frequency point based on the measured frequency deviation value; and a storage unit adapted for storing the center oscillation frequency point and the corresponding frequency calibration step in the communication terminal.

In some embodiments, the second control unit may include an activation unit adapted for activating the measurement device to receive the continuous wave signal in a predetermined period, measure two output frequencies, where the two output frequencies are output by the communication terminal respectively under control of two different frequency control words, calculate two frequency differences between each of the two measured output frequencies and a frequency of the continuous wave signal, and report the two frequency differences as the measured frequency deviation value.

In some embodiments, the second control unit may further includes a configuration unit adapted for transmitting configuration parameters for calibrating the frequency synthesizer in the communication terminal to the measurement device before activating the measurement device to receive the continuous wave signal in the predetermined period.

In some embodiments, the first calculation unit calculates the frequency calibration step of the reference crystal oscillator under the center oscillation frequency point, based on a difference between the two frequency differences and a difference between the two different frequency control words.

In some embodiments, the device may further includes a second calculation unit adapted for calculating a corresponding frequency control word of the reference crystal oscillator under the center oscillation frequency point based on the frequency calibration step, any one of the frequency control words and its corresponding frequency difference.

In some embodiments, the communication terminal may support at least one communication mode of LTE, TD-SCDMA, WCDMA, GSM, WiMax and WiFi.

Compared with the prior art, embodiments of the present disclosure have following advantages. The communication terminal is controlled to transmit a continuous wave signal (namely, a non-modulated signal) in a specified channel. Under control of the calibration device, the measurement device measures the continuous wave signal, performs a frequency deviation calculation, and report to the calibration device two successively measured frequency deviation values. Then the calibration device calculates a center oscillation frequency point of a reference crystal oscillator of the communication terminal and a frequency calibration step corresponding to the center oscillation frequency point based on the measured frequency deviation value. By using the above method, when frequency calibration is performed on a frequency synthesizer of a communication terminal supporting a new communication mode, there is no need to add additional modem modules of the new communication mode in original equipments for frequency calibration on R&D and production lines. Therefore, cost of frequency calibration is reduced, and frequency calibration time is also reduced because the measurement device doesn't need to perform power trigger, demodulating, and instruction interaction with the calibration device.

DETAILED DESCRIPTION

Figure 1:
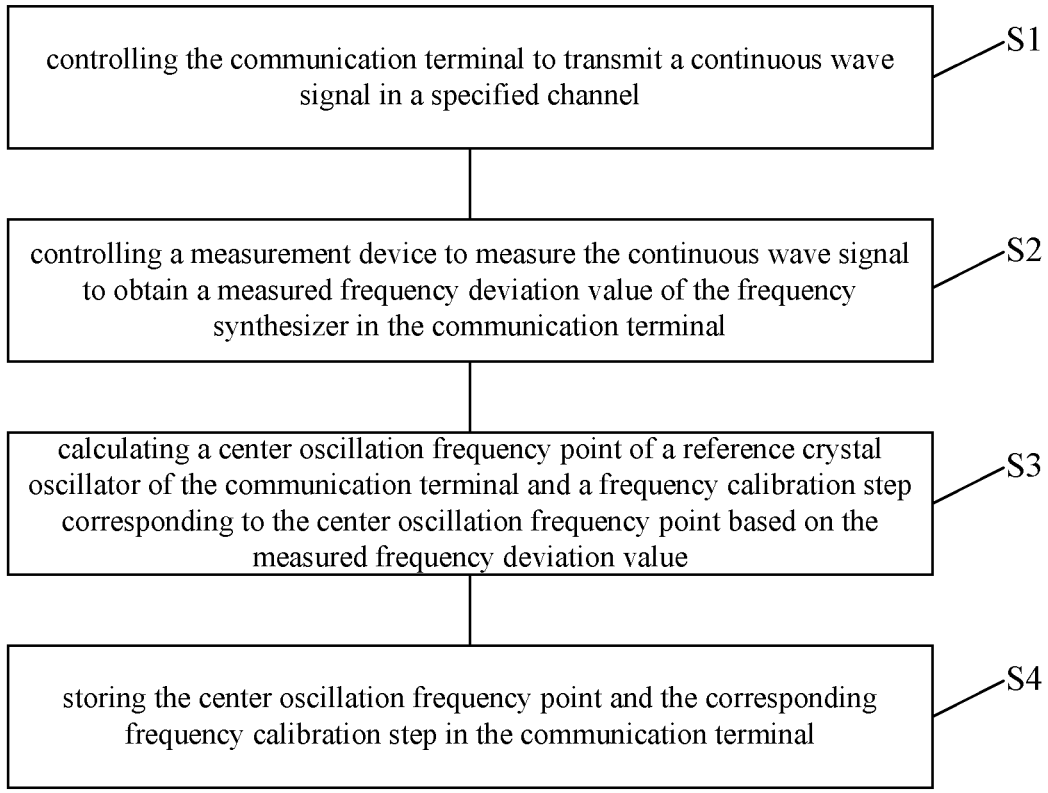
FIG. 1 illustrates a schematic flow chart of a method for calibrating a frequency synthesizer in a communication terminal according to one embodiment.

Based on the above, the prior art has the following disadvantages. If equipments for calibrating a frequency synthesizer in a communication terminal supporting one or more original communication modes are applied to calibrate a frequency synthesizer in a communication terminal supporting a new communication mode, licensed software and equipments which have a digital modem module supporting the new communication mode should be updated or bought. Therefore, cost of frequency calibration is increased because of the expensive software and equipments.

In the prior art, when a communication terminal transmits or receives a signal, the signal are transmitted after being modulated with a certain scheme, so that the received signal is a modulated signal. Under different communication modes, the received signal is modulated by different modulation schemes, which is depend on corresponding communication protocols. The modulation schemes are determined when the communication terminal are produced. Therefore, those skilled in the art usually don't consider adjusting signal transmitting and receiving manners of the communication terminal because it doesn't comply with the predetermined protocols of signal transmitting and receiving between communication terminals and base stations.

However, the modulated signal must be demodulated in a process of AFC calibration. If the conventional frequency calibration method is adopted, under a condition that the cost of frequency calibration is not increased, it is difficult to use the equipments for calibrating a frequency synthesizer in a communication terminal supporting the original communication mode to calibrate a frequency of a communication terminal supporting a new communication mode. Therefore, the conventional AFC calibration method must be adjusted.

Based on the above, embodiments of the present disclosure provide a method for calibrating a frequency synthesizer in a communication terminal. A communication terminal is controlled to transmit a continuous wave signal, namely, a non-modulated signal, in a specified channel. A measurement device (such as an integrated tester, a spectrum analyzer, etc.) measures the uplink signal and performs a frequency deviation calculation under control of a calibration device (for example, a personal computer installed with corresponding calibration tools). Then the measurement device reports two successively measured frequency deviation values to the calibration device. The calibration device calculates "a center oscillation frequency point and a frequency calibration step" based on a principle of "two points determine a line" and stores them in the communication terminal in order to calibrate the frequency synthesizer in the communication terminal.

In the above method, the source signal in the frequency deviation measurement process is adjusted. Because there is no need to demodulate the signal transmitted by the communication terminal which supports the new communication mode, additional demodulation modules which support the new communication mode is not needed in the measurement device for frequency calibration on the R&D and production lines. Cost of equipments is reduced because all original equipments and software on R&D and production lines can be preserved. Besides, frequency calibration time is reduced because the measurement device doesn't need to perform power trigger, demodulating, and instruction interaction with the calibration device. For mass production line for thousands of communication terminals, the saved time is impressive for improving production speed.

As shown in FIG. 1, a method for calibrating a frequency synthesizer in a communication terminal is provided according to one embodiment of the present disclosure. The method may include:

Step S1, controlling the communication terminal to transmit a continuous wave signal in a specified channel;

Step S2, controlling a measurement device to measure the continuous wave signal to obtain a measured frequency deviation value of the frequency synthesizer in the communication terminal;

Step S3, calculating a center oscillation frequency point of a reference crystal oscillator of the communication terminal and a frequency calibration step corresponding to the center oscillation frequency point based on the measured frequency deviation value; and Step S4, storing the center oscillation frequency point and the corresponding frequency calibration step in the communication terminal In order to clarify the objects, characteristics and advantages of the disclosure, the embodiments of the present disclosure will be described in detail in conjunction with the accompanying drawings.

It should be noted that, the communication terminal of the present disclosure need AFC frequency calibration. The communication terminal may support at least one communication mode of LTE, TD-SCDMA, WCDMA, GSM, WiMax and WiFi. In one embodiment, an LTE communication terminal is taken as an example of the communication terminal to be calibrated. It should be understood that, in other embodiments, the communication terminal to be calibrated may support one or more other communication modes.

In one embodiment, the calibration device for calibrating frequency of the frequency synthesizer in the communication terminal to be calibrated may be a personal computer installed with specific calibration tools. The process of AFC frequency calibration is performed under control of the calibration device. In addition, the measured frequency deviation value of the signal transmitted by the communication terminal is obtained by measurement and calculation of a measurement device, and the measured result is reported to the calibration device for calibration. In this embodiment, the measurement device may be an integrated tester or a spectrum analyzer.

In this embodiment, a Temperature Compensate X'tal (crystal) Oscillator (TCXO) having a center oscillation frequency point of 26 MHz is taken as an example of the reference crystal oscillator to describe the method for calibrating the frequency synthesizer in the communication terminal It is known to those skilled in the art that, different types of crystal oscillators having different center oscillation frequencies may be used in other embodiments.

Before a detailed description of an uplink AFC calibration of the communication terminal in this embodiment, a principle of AFC calibration is briefly described below.

The AFC calibration needs to obtain a characteristic curve of TCXO. Because TCXO has a good linearity, the characteristic curve of TCXO can be expressed as equations shown below:

$$F_{TCXO} = k \times \text{AFC} + b \quad (1)$$

$$F_{LO} = (F_{ARFCN}/26 \text{ MHz}) \times F_{TCXO} \quad (2)$$

where $F_{TCXO}$ represents an output frequency of TCXO (namely, an actual working center oscillation frequency point of TCXO), AFC represents a frequency control word of TCXO, k represents a change slope of TCXO under control of the frequency control word AFC, $F_{LO}$ represents a corresponding working frequency when the output frequency of TCXO is $F_{TCXO}$, and $F_{ARFCN}$ represents a channel center frequency of a frequency band in which the communication terminal normally works.

It is known to those skilled in the art that, frequency errors of communication terminals are represented by ppm (parts per million). Namely, ppm represents that a frequency error range is a few parts per million of the center frequency. When ppm is used to represent frequency deviation, it represents an allowed deviation value under a specific center frequency, where frequency is measured in Hertz (Hz). A conversion relationship between ppm and Hz can be expressed as an equation shown below:

$$\Delta f = (f^* \text{ppm})/10^6 \quad (3)$$

where ppm represents the maximum change value (+/−), f represents the center frequency (Hz), Δf represents the allowed maximum frequency deviation range. For example, if a frequency of 100 MHz allows a frequency deviation of 100 ppm, the frequency deviation is 10 kHz according to the equation (3). Namely, a maximum frequency of the system is 100.01 MHz, and a minimum frequency of the system is 99.99 MHz.

For example, when AFC of TCXO controls the maximum frequency variation range to be about 26 ppm, a corresponding frequency variation is 676 Hz. If a variation range of the frequency control word AFC is expressed as 0x0~0xFFF in hexadecimal, a number of the frequency control words is $2^{12}$. Therefore, each bit of a frequency control word corresponds to a frequency variation of 676 Hz/$2^{12}$=0.165 Hz of TXCO, a frequency variation at 2300 MHz is 2300*26/$2^{12}$=14.6 Hz, and a frequency variation at 2620 MHz is 2620*26/$2^{12}$=16.6 Hz.

Therefore, under a fixed $F_{ARFCN}$, the value of K, the center oscillation frequency point of TCXO and its corresponding frequency control word $AFC_0$ in equation (1) can be obtained by measuring output frequencies corresponding to any two AFCs of the communication terminal An example of the method for calibrating a frequency synthesizer in a communication terminal is described below according to one embodiment.

In Step S1, control the communication terminal to transmit a continuous wave signal in a specified channel.

In one embodiment, because of the signal transmitting characteristics of LTE system, a frequency of the continuous wave signal usually has a predetermined deviation from a center frequency of a frequency band supported by the communication terminal.

In an implementation, a calibration device controls the communication terminal to be calibrated to transmit a continuous wave signal with a power of 6 dBm, where the continuous wave signal has a frequency deviation of 7.5 kHz from a channel center frequency. This signal is a non-modulated signal. For example, Channel 38050 of LTE system is used, and the channel center frequency is 2.6 GHz. Therefore, the frequency of the AFC calibration signal is 2.6 G+7.5 kHz.

At a same time of controlling the communication terminal to transmit a signal, the calibration device also performs Step S2. Namely, the calibration device controls the measurement device to measure the continuous wave signal to obtain a measured frequency deviation value of a reference crystal oscillator of the frequency synthesizer in the communication terminal.

In one embodiment, Step S2 may include: controlling the measurement device to receive the continuous wave signal in a predetermined period; measuring two output frequencies respectively, where the two output frequencies are output by the communication terminal under control of two different frequency control words; calculating two frequency differences between the two measured output frequencies and a frequency of the continuous wave signal; and reporting the two frequency differences as the measured frequency deviation value.

In one embodiment, the predetermined period starts from a time point after a first time interval elapses since a calibration method is received, and ends after a second time interval in which the communication terminal transmits the continuous wave signal; and the first time interval and the second time interval are determined based on computing performance of the communication terminal and the measurement device.

In an implementation, the first time interval values a time period for lasting 3 to 5 consecutive subframes, and the second time interval values a time period for lasting 8 to 10 consecutive subframes.

Figure 2:
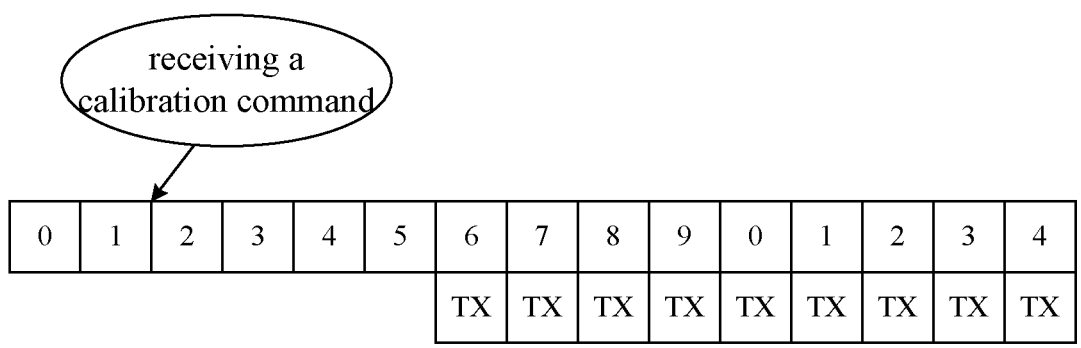
FIG. 2 schematically illustrates a frame arrangement diagram of a continuous wave signal transmitted by the communication terminal according to one embodiment.

Referring to FIG. 2, in an LET system, if a calibration command is received from the calibration device at the start time of the subframe 2, the communication terminal may transmit signals of 9 subframes in a period from the subframe 6 to the subframe 4 of next radio frame. TX represents transmission of uplink signals in FIG. 2. The period between the subframe 2 and the subframe 5 corresponds to the first interval, and the period between the subframe 6 and the subframe 4 of the next radio frame corresponds to the second time interval.

In one embodiment, a frame arrangement of the uplink continuous wave signal, which is transmitted by the communication terminal under control of the calibration device, is determined based on computing performance the measurement device and the communication terminal in an actual AFC calibration application. If the measurement device and the communication terminal have a fast processing speed and a good performance, the first time interval and the second time interval can be set to short time periods. Otherwise, the first time interval and the second time interval should be set to long time periods, in order to avoid a situation that the measurement device cannot effectively receive the continuous wave signal transmitted by the communication device. However, the second time interval cannot be set to too long, which may extend the calibration time and reduce efficiency of the AFC calibration. As shown in repeated experiments, the frame arrangement provided in this embodiment not only can ensure the measurement device can accurately measure the continuous wave signal transmitted by the communication terminal, but also doesn't affect the efficiency of AFC calibration.

In an implementation, the measurement device measures output frequencies F of the communication terminal which is under control of two different frequency words $AFC_1$ and $AFC_2$, where F includes $F_1$ corresponding to $AFC_1$ and $F_2$ corresponding to $AFC_2$, and the frequency control words $AFC_1$ and $AFC_2$ can be configured by the calibration device. After measuring the output frequencies, the measurement device further calculates two frequency differences between the two measured output frequencies and a frequency of the continuous wave signal.

Specifically, after obtaining the measured values $F_1$ and $F_2$ of the output frequencies of the communication terminal, a difference between a output frequency of the communication terminal and the channel center frequency is defined as $\Delta F$, then $\Delta F = F - (F_{ARFCN} + 7.5 \text{ kHz})$. $\Delta F_1$ corresponding to $F_1$ and $\Delta F_2$ corresponding to $F_2$ can be obtained by putting $F_1$ and $F_2$ into the above equation, respectively.

In an implementation, the measurement process of the measurement device can be divided into two steps. In a first step, $F_1$ corresponding to $AFC_1$ is measured, and after $\Delta F_1$ is calculated, this measured frequency deviation value $\Delta F_1$ is reported to the calibration device. Similarly, in a second step, $F_2$ corresponding to $AFC_2$ is measured, and after $\Delta F_2$ is calculated, this measured frequency deviation value $\Delta F_2$ is reported to the calibration device. After receiving the two measured frequency deviation values from the measurement device, the calibration device can calculate a center oscillation frequency point and a corresponding frequency calibration step of the reference crystal oscillator of the communication terminal.

In one embodiment, Step S2 further includes: before activating the measurement device to receive the continuous wave signal in the predetermined period, transmitting configuration parameters for calibrating the frequency synthesizer in the communication terminal to the measurement device. The calibration device transmits the configuration parameters to the measurement device, so that the measurement device can determine all parameters for measurement. The configuration parameters may include a time when the communication terminal starts to transmit, the transmission frequency, etc. Because the measurement device can accurately determine a time to measure, that is the measurement device can determine to start measurement at a specific subframe, a power trigger process for activating measurement of frequency deviation by the measurement device is not needed. Therefore, the measurement efficiency is improved.

After the measurement device reported the measured frequency deviation values to the calibration device, Step S3 is performed. In Step S3, a center oscillation frequency point of a reference crystal oscillator of the communication terminal and a frequency calibration step corresponding to the center oscillation frequency point are calculated based on the measured frequency deviation values.

In a situation that the measured frequency deviation values have been received, a center oscillation frequency point of the reference crystal oscillator of the communication terminal in an actual working situation can be calculated based on the output frequency of the communication terminal, the channel center frequency of the communication terminal in the normal working situation, and the center frequency of the reference crystal oscillator.

In one embodiment, Step S3 may include: calculating a corresponding frequency calibration step of the reference crystal oscillator under the center oscillation frequency point based on a difference between the two frequency differences and a difference between the two different frequency control words.

Specifically, a frequency deviation value corresponding to each bit of the control word can be obtained by calculating a frequency deviation value of two points based on equations (1) and (2). Namely, a slope value K representing the frequency calibration step corresponding to the center oscillation frequency point of the reference crystal oscillator can be obtained according to an equation shown below:

$$k=(\Delta F_2-\Delta F_1)/(AFC_2-AFC_1).$$

In one embodiment, the method for calibrating the frequency synthesizer in the communication terminal may further include: calculating a corresponding frequency control word of the reference crystal oscillator under the center oscillation frequency point based on the frequency calibration step, any one frequency control word and its corresponding frequency difference.

For example, a frequency control word $AFC_0$ corresponding to the center oscillation frequency point of the reference crystal oscillator can be obtained according to an equation: $AFC_0=AFC_1-\Delta F_1/(k)$. In some embodiments, $AFC_0$ also can be obtained by putting $AFC_2$ and $\Delta F_2$ to the above equation.

After Step S3, Step S4 is performed. In Step S4, the center oscillation frequency point and the corresponding frequency calibration step are stored in the communication terminal.

Specifically, the center oscillation frequency point of the reference crystal oscillator, and its corresponding frequency calibration step and frequency control word can be stored in a non-volatile memory of the communication terminal Therefore, frequency characteristics of the communication terminal, at least two calibration results of the center oscillation frequency point and the standard frequency calibration step, are stored in the communication terminal. In a normal working mode, the communication terminal can calculate a present working frequency and a magnification of the frequency calibration step by calling the above two calibration results, so that the frequency deviation is accurately controlled, and synchronization is kept with the base station.

In conclusion, in an uplink AFC calibration mode, the communication terminal is controlled to respectively transmit two signal frequency signals to the measurement device in a specified channel. Different AFC values are used at those two times. The calculation device is used to calculated frequency deviation information. Frequency deviation value corresponding to each bit is obtained by calculating frequency differences of two points. Then an AFC value to be used is calculated.

Figure 3:
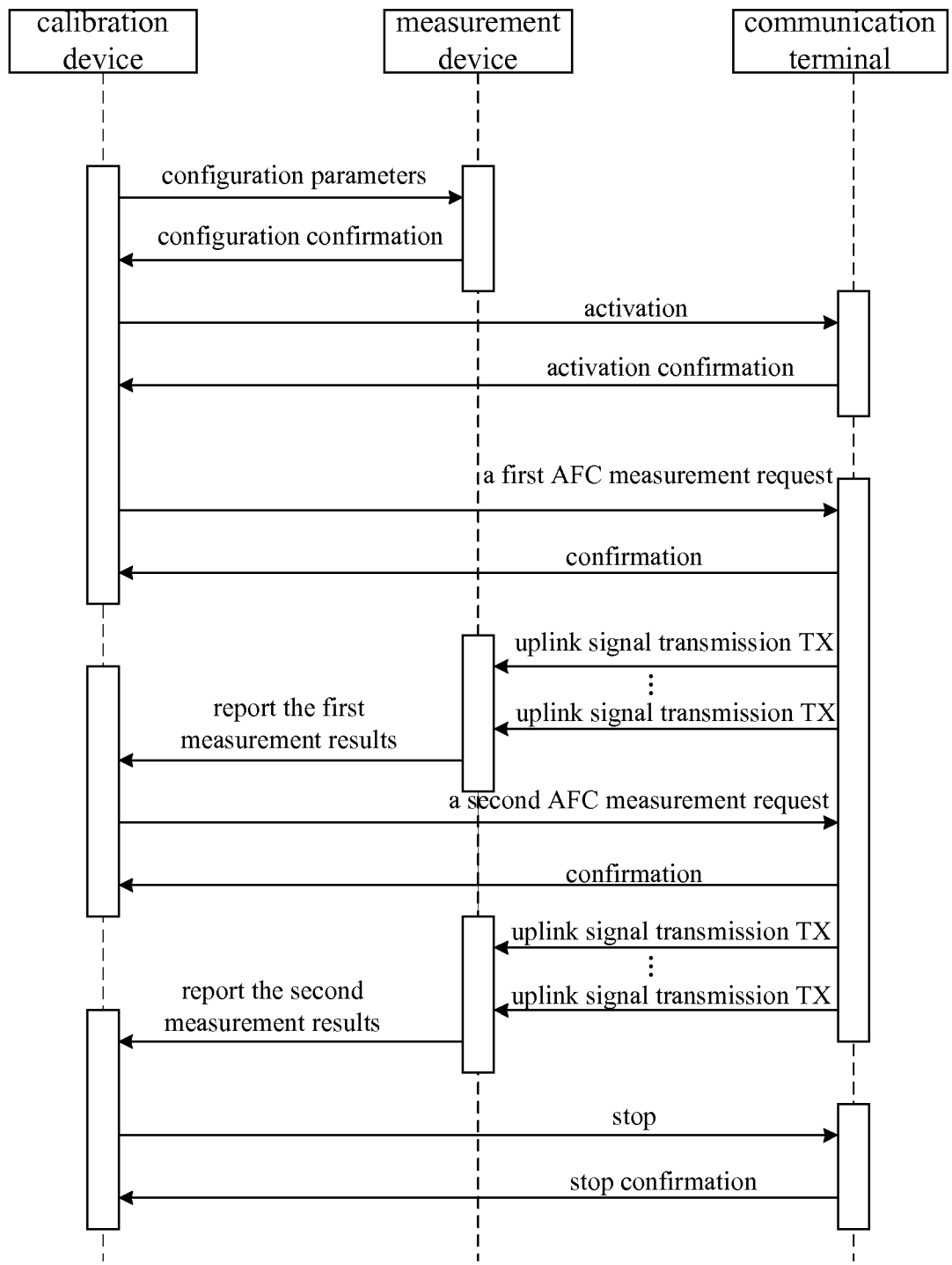
FIG. 3 illustrates a schematic flow chart of uplink AFC calibration according to one embodiment.

The above AFC calibration flow will be described below in conjunction with FIG. 3.

First, the calibration device transmits configuration parameters for calibrating the frequency synthesizer in the communication terminal to the measurement device. After receiving the configuration parameters, the measurement device returns a configuration confirmation message to the calibration device.

After transmitting the configuration parameters to the measurement device, the calibration device activates the communication terminal to transmit a continuous wave signal in a specified channel in a predetermined period. After being activated, the communication terminal returns an activation confirmation message to the calibration device.

After determining the communication terminal is activated successfully, the calibration device may start a first AFC measurement, and transmit a measurement request to the communication terminal, where the measurement request at least includes a first frequency control word $AFC_1$. After receiving the first measurement request, the communication terminal should return a confirmation message to the calibration device.

After returning the confirmation message of the measurement request, the communication terminal transmits uplink signals in the predetermined period. That is, the communication terminal keeps sending a continuous wave signal to the measurement device, which are represented by TX.

The measurement device measures the uplink signal transmitted by the communication terminal, calculates a corresponding measured frequency deviation value $\Delta F_1$, and reports a first measurement result to the calibration device.

After receiving the first measurement result, the calibration device may start a second AFC measurement. A process of the second AFC measurement can refer to the first AFC measurement, and is not described in detail herein.

After receiving a second measurement result (namely, the measured frequency deviation value $\Delta F_2$), the calibration device can calculate a center oscillation frequency point and a corresponding frequency calibration step of a reference crystal oscillator of the communication terminal. Simultaneously, the calibration device may send a stop command to the communication terminal. The stop command is used to inform the communication terminal to stop to transmit uplink signals after receiving the stop command and returning a stop confirmation message to the calibration device.

In actual implementations, the method for calibrating the frequency synthesizer in the communication terminal according to embodiments of the present disclosure is simple, and can be implemented in LTE systems and conventional chip technology. Therefore, the method can effectively promote the development of LET industry, because AFC calibration speed is increased and cost for updating equipments on the production line is saved.

Figure 4:
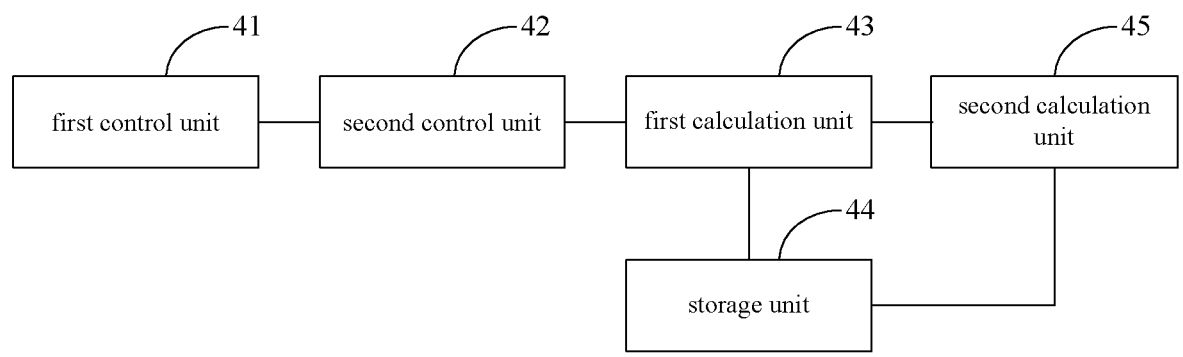
FIG. 4 illustrates a schematic structural diagram of a device for calibrating a frequency synthesizer in a communication terminal according to one embodiment.

Corresponding to the above method, a device for calibrating a frequency synthesizer in a communication terminal is provided according to one embodiment. As shown in FIG. 4, the device may include: a first control unit 41 adapted for controlling the communication terminal to transmit a continuous wave signal in a specified channel; a second control unit 42 adapted for controlling a measurement device to measure the continuous wave signal to obtain a measured frequency deviation value of the frequency synthesizer in the communication terminal; a first calculation unit 43 adapted for calculating a center oscillation frequency point and a corresponding frequency calibration step of a reference crystal oscillator of the communication terminal based on the measured frequency deviation value; and a storage unit 44 adapted for storing the center oscillation frequency point and the corresponding frequency calibration step in the communication terminal.

In one embodiment, the communication terminal to be calibrated may support at least one communication mode of TD-SCDMA, WCDMA, GSM, WiMax and WiFi.

In an implementation, the second control unit 42 may include an activation unit (not shown in FIG. 4), which is adapted for activating the measurement device to receive the continuous wave signal in a predetermined period, measure two output frequencies respectively, where the two output frequencies are output by the communication terminal under control of two different frequency control words, calculate two frequency differences between the two measured output frequencies and a frequency of the continuous wave signal, and report the two frequency differences as the measured frequency deviation value.

In one embodiment, the second control unit 42 further includes a configuration unit (not shown in FIG. 4), which is adapted for transmitting configuration parameters for calibrating the frequency synthesizer in the communication terminal to the measurement device before activating the measurement device to receive the continuous wave signal in the predetermined period.

In an implementation, the first calculation unit calculates the corresponding frequency calibration step of the reference crystal oscillator under the center oscillation frequency point, based on a difference between the two frequency differences and a difference between the two different frequency control words.

In one embodiment, the calibration device for calibrating the frequency synthesizer in the communication terminal may further include a second calculation unit 45, which is adapted for calculating a corresponding frequency control word of the reference crystal oscillator under the center oscillation frequency point based on the frequency calibration step, any one frequency control word and its corresponding frequency differences. It should be understood that the process of the second calculation unit 45 calculates the corresponding frequency control word of the reference crystal oscillator under the center oscillation frequency point is under a condition that the frequency calibration step has been calculated by the first calculation unit 43. Moreover, the calculation results of the second calculation unit 45 also can be stored in the communication terminal by the storage device.

Implementations of the device for calibrating the frequency synthesizer in the communication terminal can refer to above embodiments of the corresponding method, and is not described in detail herein.

It should be known to those skilled in the art, all or part of the device for calibrating the frequency synthesizer in the communication terminal can be implemented by corresponding hardware instructed by a program. The program may be stored in a computer readable storage medium, where the storage medium may be ROM, RAM, Disks, CD-ROMs, etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for calibrating a frequency synthesizer in a communication terminal, comprising:

controlling the communication terminal to transmit a continuous wave signal in a specified channel, wherein the continuous wave signal is a non-modulated signal;

controlling a measurement device to measure the continuous wave signal to obtain a measured frequency deviation value of the frequency synthesizer in the communication terminal;

calculating a center oscillation frequency point of a reference crystal oscillator of the communication terminal and a frequency calibration step corresponding to the center oscillation frequency point based on the measured frequency deviation value; and storing the center oscillation frequency point and the corresponding frequency calibration step in the communication terminal, wherein controlling the measurement device to measure the continuous wave signal to obtain the measured frequency deviation value of the frequency synthesizer in the communication terminal comprises: controlling the measurement device to receive the continuous wave signal in a predetermined period; measuring two output frequencies, where the two output frequencies are output by the communication terminal respectively under control of two different frequency control words; calculating two frequency differences between each of the two measured output frequencies and a frequency of the continuous wave signal; and reporting the two frequency differences as the measured frequency deviation value; and wherein calculating the center oscillation frequency point of the reference crystal oscillator of the communication terminal and the frequency calibration step corresponding to the center oscillation frequency point comprises: calculating the corresponding frequency calibration step of the reference crystal oscillator under the center oscillation frequency point, based on a difference between the two frequency differences and a difference between the two different frequency control words.

2. The method according to claim 1, wherein controlling the measurement device to measure the continuous wave signal to obtain the measured frequency deviation value of the frequency synthesizer in the communication terminal further comprises: before activating the measurement device to receive the continuous wave signal in the predetermined period, transmitting, to the measurement device, configuration parameters for calibrating the frequency synthesizer in the communication terminal.

3. The method according to claim 1, further comprising: calculating a corresponding frequency control word of the reference crystal oscillator under the center oscillation frequency point based on the frequency calibration step, any one of the frequency control words and its corresponding frequency difference.

4. The method according to claim 1, wherein the predetermined period starts from a time point after a first time interval elapses since a calibration command is received, and ends after a second time interval in which the communication terminal transmits the continuous wave signal; and the first time interval and the second time interval are determined based on computing performance of the communication terminal and the measurement device.

5. The method according to claim 4, wherein the first time interval values a time period for lasting 3 to 5 consecutive subframes, and the second time interval values a time period for lasting 8 to 10 consecutive subframes.

6. The method according to claim 1, wherein the communication terminal supports at least one communication mode of LTE, TD-SCDMA, WCDMA, GSM, WiMax and WiFi.

7. A device for calibrating a frequency synthesizer in a communication terminal, comprising:
- a first control unit adapted for controlling the communication terminal to transmit a continuous wave signal in a specified channel, wherein the continuous wave signal is a non-modulated signal;
- a second control unit adapted for controlling a measurement device to measure the continuous wave signal to obtain a measured frequency deviation value of the frequency synthesizer in the communication terminal;
- a first calculation unit adapted for calculating a center oscillation frequency point of a reference crystal oscillator of the communication terminal and a frequency calibration step corresponding to the center oscillation frequency point based on the measured frequency deviation value; and
- a storage unit adapted for storing the center oscillation frequency point and the corresponding frequency calibration step in the communication terminal,
- wherein the second control unit comprises an activation unit adapted for activating the measurement device to receive the continuous wave signal in a predetermined period, measure two output frequencies, where the two output frequencies are output by the communication terminal respectively under control of two different frequency control words, calculate two frequency differences between each of the two measured output frequencies and a frequency of the continuous wave signal, and report the two frequency differences as the measured frequency deviation value; and
- wherein the first calculation unit calculates the frequency calibration step of the reference crystal oscillator under the center oscillation frequency point, based on a difference between the two frequency differences and a difference between the two different frequency control words.

8. The device according claim 7, wherein the second control unit further comprises a configuration unit adapted for transmitting configuration parameters for calibrating the frequency synthesizer in the communication terminal to the measurement device before activating the measurement device to receive the continuous wave signal in the predetermined period.

9. The device according to claim 7, further comprising: a second calculation unit adapted for calculating a corresponding frequency control word of the reference crystal oscillator under the center oscillation frequency point based on the frequency calibration step, any one of the frequency control words and its corresponding frequency difference.

10. The device according to claim 7, wherein the communication terminal supports at least one communication mode of LTE, TD-SCDMA, WCDMA, GSM, WiMax and WiFi.

* * * * *